Oct. 12, 1937.  H. J. SULLIVAN  2,095,843
AUXILIARY CABLE BIGHT
Filed Oct. 29, 1936
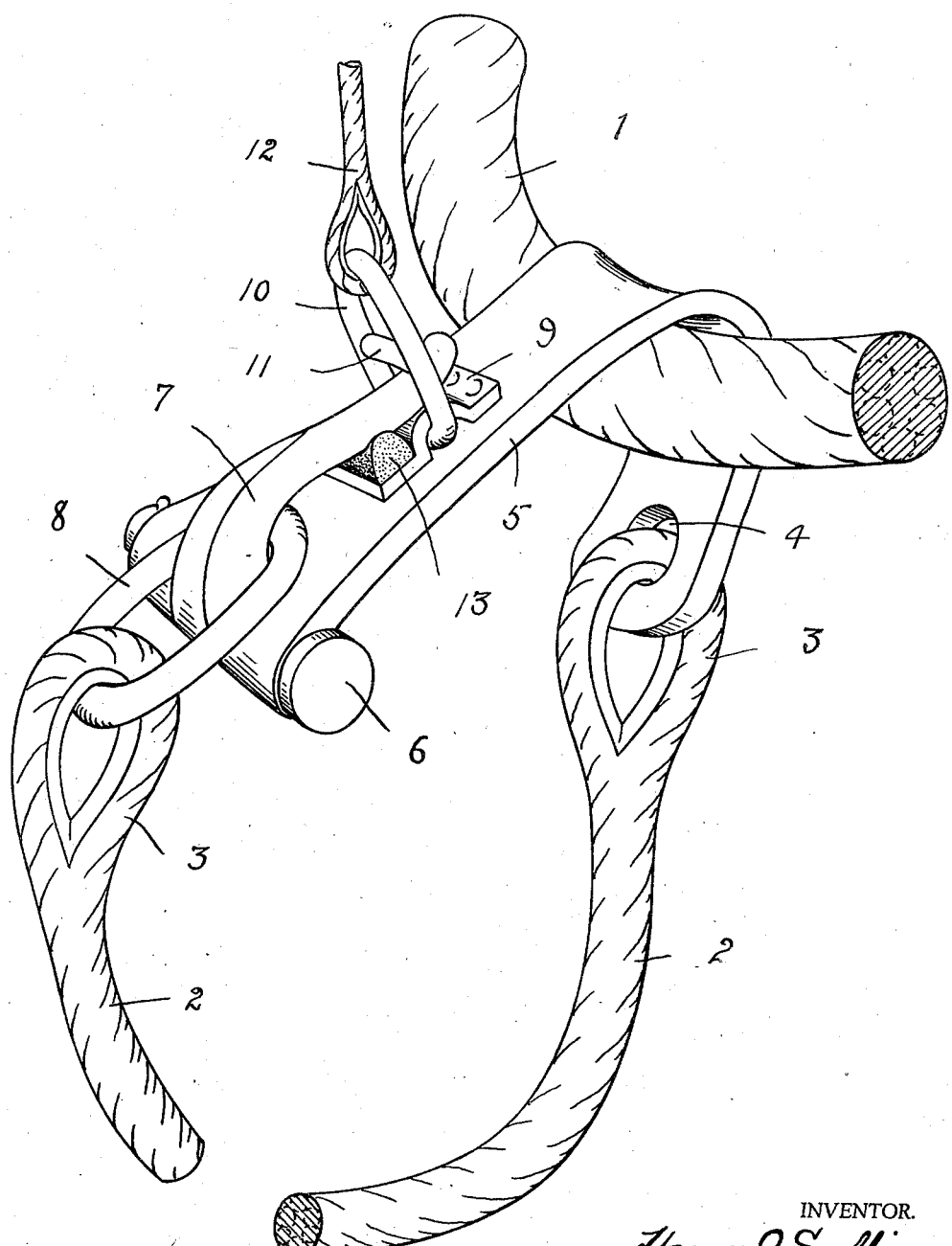
INVENTOR.
Henry J. Sullivan.
BY Geo Stevens
ATTORNEY.

Patented Oct. 12, 1937

2,095,843

UNITED STATES PATENT OFFICE 2,095,843

AUXILIARY CABLE BIGHT

Henry J. Sullivan, Duluth, Minn.

Application October 29, 1936, Serial No. 108,209

5 Claims. (Cl. 114—230)

This invention relates to holding means for cable terminals and has special reference to what might be termed auxiliary bights for cable or line attachments to other objects.

It is well known to marine men, or the like, that considerable difficulty is experienced in the making fast and letting go of lines from aboard ship, especially when moored at a dock, and in many instances it requires a sailor both on board ship and at the terminal of the line to make fast or release the mooring line or cable.

It is also known that the great majority of such mooring lines are of wire construction and that the mooring cleats or timberheads are now usually of metal or concrete, necessitating much more positive and stronger attachment for such line than heretofore.

The principal object of the instant invention is to provide an auxiliary bight for such a mooring line, or the like, which may be remotely controlled in respect to its being released, and accomplished for example by a heaving line such as are usually carried aboard ship, as well as acting as a connection between the bight of the mooring line and the heaving line, the convenience of which is well known to those versed in the art.

Other minor objects will appear in the further description of the invention.

Referring now to the accompanying drawing, forming part of this application, and wherein like reference characters indicate like parts:

The figure is a perspective view of a broken auxiliary bight illustrating one embodiment of the invention as applied to a fragmental portion of a mooring or other line bight.

In the drawing, the numeral 1 represents the bight of a service line, such as a mooring or towing line of a vessel or the like which it is desired from time to time to make fast to other objects such as timberheads, cleats, or the like. 2 represents a loop or bight formed of a suitable rope or wire line having cringled or grommeted loops 3 at the termini thereof, or it is obvious that these terminals may be equipped with other similar attachments. One of these cringled termini is illustrated as being formed directly within a hole 4 within one terminus of the flat metal saddle hook member 5, the opposite terminus of which is bifurcated and turned backwardly and inwardly upon itself forming spaced eyes therein for reception of the through pin or bolt 6, and intermediate of which bifurcated portions the pin pivotally carries the dog 7. This dog is for optional engagement or release in connection with for example the link 8 carried by the other cringled end of the bight 2, or directly with such if preferred.

A catch is formed for the free end of the dog 7 by the link holding clip member 9 riveted or otherwise fixed to the back of the member 5 intermediate of its ends; the link 10 being pivotally held as shown intermediate of the ends of the member 9 so that the link is free to flop one way or the other thereupon. This link 10 is of the bar type having a cross member 11 intermediate of its ends and formed integral therewith. This cross-member, when the link 10 is in its uppermost position, that is at substantially right angles to the back of the member 5, acts as a keeper for the otherwise free end of the dog to prevent its opening up for the release of the link 8 held thereby. To the outermost free end of the link 10 may be attached in any desired manner an operating line known to mariners, for example, as a heaving line, and illustrated at 12. This connection to the heaving line may or may not be made permanent so that the auxiliary bight is always available for any purpose desired through the medium of the heaving line, and furthermore provides means whereby the bight when desired may be released from a distance remote from its use as for example on board a vessel when the bight is used for mooring purposes, thus avoiding the necessity of an attendant at the bight of the mooring line, as a sharp jerk or pull on the heaving line will flop the link 10 outwardly and over the nose of the dog and thus release it, when a pull on the mooring line will obviously disconnect the auxiliary bight from the mooring object such as a timber head or the like.

The exterior of the bent portion of the member 5 is concaved, or made somewhat saddle-like in form, for less frictional and objectionable connection with the bight 1 of the mooring line.

To assist in the more ready release of the dog 7 as well as to maintain its locked position as illustrated I have provided a resilient means beneath same and preferably attached to or supported by the member 9. For this purpose I have here shown a member 13 formed of soft rubber which tends to hold the free end of the dog slightly above the arch in the member 9 and in contact with the bar 11 of the link thereabouts when such is the case, or when the link is removed by drawing it over the free end of the dog the latter will be slightly depressed and more readily spring upwardly when the link releases same. In some instances it may be desirable for the dog to remain closed at all times when stress is put upon the bight end and in which event it is obvious that a slight changing in shape of the throat 14 of the dog would suffice to bring about such result.

From the foregoing it is evident that the device may be used to especially good advantage as an auxiliary mooring bight to be applied around a timberhead or the like, and at any time readily released by one having contact with the heaving line on board ship, and that in many other instances it might be convenient to release such a connection from a distance where access may be had to the heaving or trigger line, when the latter may be permanently fixed to the link 10 as illustrated in the drawing, it being understood that when used in connection with vessel mooring the heaving line is simply temporarily tied to the link 10 as desired.

Having thus described my invention, what I claim and desire to secure by Letters Patent, is:

1. An auxiliary bight for mooring lines or the like comprising an angularly shaped saddle for hooked engagement with the bight of a mooring line, a relatively short line pivotally fixed in one end of said saddle, a hook pivoted in the other end of said saddle for removable engagement with the other end of said short line, and a link engageable with the free end of said hook for normally holding said line securely thereto.

2. An auxiliary bight for line terminals comprising a major hooked member, a minor hooked member pivotally carried upon one end of said major member, a catch upon the back of said major member for engagement with the free end of said minor member, a rope loop having one end fixed to the hooked end of said major member and its opposite end engageable with said minor member, and means for locking or unlocking said catch.

3. An auxiliary bight for line terminals comprising a major hooked member, a minor hooked member pivotally carried upon one end of said major member, a catch upon the back of said major member for engagement with the free end of said minor member, a rope loop having one end fixed to the hooked end of said major member and its opposite end engageable with said minor member, and means for remote control of said catch.

4. The combination with a vessel's mooring line having a fixed looped terminal, of an auxiliary bight releasably secured within the loop of said mooring line and about the object to which the vessel is moored, and a heaving line attached to said auxiliary bight and by which said bight may be released from a distance.

5. The combination with the looped terminal of a vessel's mooring line, of an auxiliary bight for attachment within the loop of said mooring line and about the object to which the vessel is moored, means for releasing said bight from said loop, and a heaving line attached to said bight releasing means and whereby said bight may be released from a distance.

HENRY J. SULLIVAN.